(12) United States Patent
Berg

(10) Patent No.: US 9,290,154 B2
(45) Date of Patent: Mar. 22, 2016

(54) APPARATUS AND METHOD FOR DISABLING A VEHICLE

(71) Applicant: Gary S. Berg, Campbell, CA (US)

(72) Inventor: Gary S. Berg, Campbell, CA (US)

( * ) Notice: Subject to any disclaimer, the term of this patent is extended or adjusted under 35 U.S.C. 154(b) by 0 days.

(21) Appl. No.: 14/625,637

(22) Filed: Feb. 19, 2015

(65) Prior Publication Data

US 2015/0232066 A1     Aug. 20, 2015

Related U.S. Application Data

(60) Provisional application No. 61/941,994, filed on Feb. 19, 2014.

(51) Int. Cl.
*B60R 25/043*     (2013.01)

(52) U.S. Cl.
CPC .................... *B60R 25/043* (2013.01)

(58) Field of Classification Search
CPC .................................................. B60R 25/043
See application file for complete search history.

(56) References Cited

U.S. PATENT DOCUMENTS

| | | | | |
|---|---|---|---|---|
| 3,077,916 A | * | 2/1963 | Vaughn | B21D 41/026 72/393 |
| 3,986,383 A | * | 10/1976 | Petteys | B21D 1/08 269/48.1 |
| 4,683,735 A | * | 8/1987 | Magrobi | B60K 15/0409 180/287 |
| 5,249,442 A | * | 10/1993 | Wright | B60R 25/043 180/287 |
| 2007/0163431 A1 | * | 7/2007 | Mohar | B60R 25/043 89/1.11 |

FOREIGN PATENT DOCUMENTS

| | | | | |
|---|---|---|---|---|
| AU | WO 9920496 A1 | * | 4/1999 | B60R 25/043 |
| GB | 2505876 A | * | 3/2014 | F42B 12/34 |

* cited by examiner

*Primary Examiner* — Paul N Dickson
*Assistant Examiner* — Darlene P Condra

(57) ABSTRACT

An apparatus for disabling a motor vehicle comprises an expandable head adapted to be inserted and secured into the exhaust pipe of an automobile, motorcycle, go-kart, scooter, boat, tractor or other vehicle having an internal combustion engine. A shaft of the apparatus may be configured to engage with a tool, e.g., a socket wrench, torque wrench, drill driver, or other tool, which may impart a rotational force on the shaft to radially expand a head of the apparatus and secure it within a tailpipe of a vehicle, such that buildup of pressure within the vehicle exhaust system does not expel the apparatus from the pipe. An axial bore through the shaft may be fitted at a terminal end with a pressure release valve to selectively release pressure, e.g., before removing the device, or to allow operation of the vehicle while the apparatus is secured within the tailpipe.

19 Claims, 7 Drawing Sheets

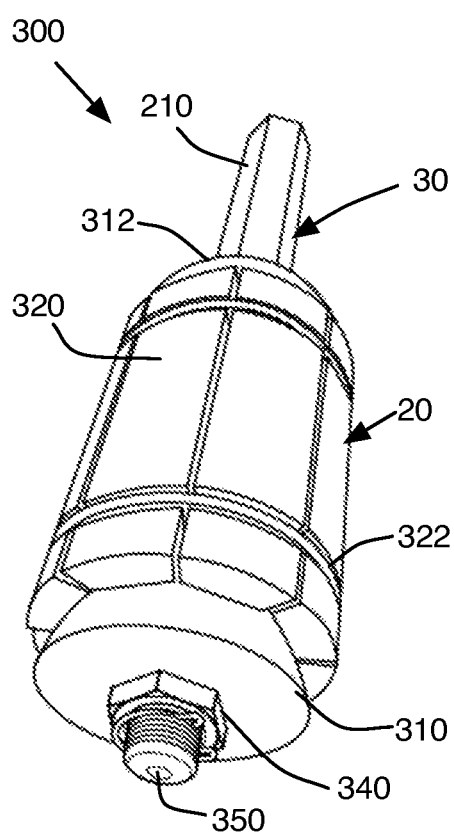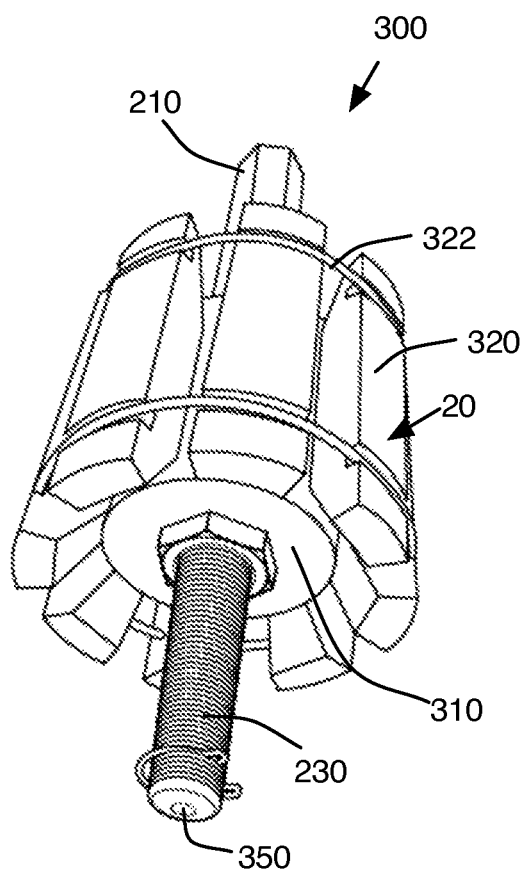
FIG. 3A
FIG. 3B

APPARATUS AND METHOD FOR DISABLING A VEHICLE

CROSS REFERENCE TO RELATED APPLICATIONS

This application claims priority under 35 U.S.C. §119 to U.S. Provisional Application Ser. No. 61/941,994 filed on Feb. 19, 2014, which application is incorporated by reference herein in its entirety.

TECHNICAL FIELD

This invention relates to the field of motorized vehicles. More specifically, this invention relates to apparatus and methods for disabling a vehicle.

BACKGROUND

Unless otherwise indicated herein, the approaches described in this section are not prior art to the claims in this application and are not admitted to be prior art by inclusion in this section. Each reference cited herein is incorporated by reference herein in its entirety.

Various types of devices for inhibiting or disabling a vehicle are known, and have been used for example by vehicle owners as anti-theft devices or by law enforcement personnel to prevent a vehicle from fleeing or otherwise being moved. In the case of law enforcement, wheel locks, spike strips, projectiles, physical barriers and other devices and methods are used to prevent a chase or disable a moving vehicle. Once a chase begins, however, the use of devices such as spike strips or road blocks can result in serious harm to officers or bystanders and/or damage to property. Therefore, devices and methods for effectively disabling operation of a vehicle before a chase ensues are desired.

One method of disabling a vehicle with an internal combustion engine is to block the engine exhaust, which causes exhaust pressure to build up and inhibits the intake of air needed for the engine to start and/or continue to run. For example, U.S. Pat. No. 4,683,735 to Magrobi discloses a lockable cap adapted to fit over a modified exhaust pipe. U.S. Pat. No. 5,249,422 to Wright discloses another exhaust pipe lock utilizing a plug that is inserted into the end of an exhaust pipe and a pin or other locking key that is fitted laterally through the pipe and the plug to secure the plug. Both of these devices are clearly visible from the end of the vehicle and require modification of the tailpipe in order to secure the plug or cap to the tailpipe. Similarly, U.S. Pat. No. 5,839,081 to Joao and U.S. Pat. No. 5,917,406 to Postel disclose devices that require modifications to a vehicle's exhaust system to fit an electronically controlled flow inhibitor within the system.

U.S. Pat. No. 7,451,851 to Wax discloses both (i) an exhaust plug that is manually inserted using an extension handle that extends from the tailpipe, where the plug material expands upon heating and is adhesive to the exhaust pipe, and (ii) a method of disabling a vehicle by blocking the vehicle's tailpipe with a length of adhesive material attached to the front bumper of a police vehicle. Both of these methods have disadvantages, including the likelihood that the plug or adhesive may be dislodged or ejected from the tailpipe by pressure within the exhaust system, the potential to damage the tailpipe of the vehicle (e.g., by adhesive material fusing to the exhaust pipe or vehicle, or physical damage to the vehicle caused by impact of the bumper of the pursuing vehicle), and that the devices are clearly visible from the rear of the potentially "disabled" vehicle and therefore may be easily removed before starting the vehicle. Also, these and other systems may be potentially dangerous to remove from a vehicle if pressure has built up within the exhaust system.

Thus, there remains a need for devices and methods for safely and effectively disabling a vehicle without easy detection and without modifying or damaging the vehicle exhaust system.

SUMMARY

An apparatus for disabling a motor vehicle comprises an expandable body that is adapted to be manually inserted and secured into the exhaust pipe of an automobile, motorcycle, go-kart, scooter, boat, tractor or other vehicle having an internal combustion engine. The shaft preferably is configured and dimensioned to engage with a tool, e.g., a socket wrench, torque wrench, drill driver, or other tool, which may be used to impart a rotational force on an elongated shaft of the apparatus to radially expand the head of the apparatus and secure it within a tailpipe of a vehicle, such that buildup of pressure within the engine and exhaust system does not expel the apparatus from the pipe. An axial bore through the shaft is fitted at a terminal end with a pressure release valve to selectively release pressure, e.g., before removing the device, or to allow operation of the vehicle while the apparatus is secured within the tailpipe.

In one aspect, a method of disabling a vehicle comprises securing an expandable plug apparatus within the exhaust pipe of a vehicle, and activating an expander mechanism to expand the plug radially within the pipe to seal the plug against the inner walls of the pipe. In some embodiments, activating the expander mechanism comprises rotating a shaft of the device using a tool. In some embodiments, the tool is a wrench, a socket wrench, a ratchet device, a driver, or any other tool used to engage the handle portion of the plug apparatus. In some embodiments, the apparatus is secured manually. Preferably, plug is secured with enough radial force to ensure that the apparatus is not expelled from the tailpipe when engine is running. A pressure relief valve within apparatus may be closed when device is in use, and opened to relieve pressure within the exhaust system to facilitate safe removal of the apparatus from a tailpipe. In preferred embodiments, no alteration to the tailpipe or exhaust system is needed for securing the plug apparatus within a vehicle exhaust pipe, and no damage is done to the exhaust pipe or vehicle when the apparatus is used to disable the vehicle.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

For a better understanding of the nature and objects of the invention, reference should be made to the following detailed description taken in conjunction with the accompanying drawings, in which:

FIG. 3A is a perspective view illustration of an embodiment of an expander mechanism of the apparatus of FIG. 1, shown in a retracted state;

FIG. 3B is a perspective view illustration of an embodiment of an expander mechanism of the apparatus of FIG. 1, shown in an expanded state;

DETAILED DESCRIPTION

Described herein are apparatus and methods for disabling a vehicle having an internal combustion engine. In the following description, for purposes of explanation, numerous examples and specific details are set forth in order to provide a thorough understanding of the present invention. It will be evident, however, to one skilled in the art that the present invention may include some or all of the features in these examples alone or in combination with other features described below, and may further include modifications and equivalents of the features and concepts described herein.

Figure 1:
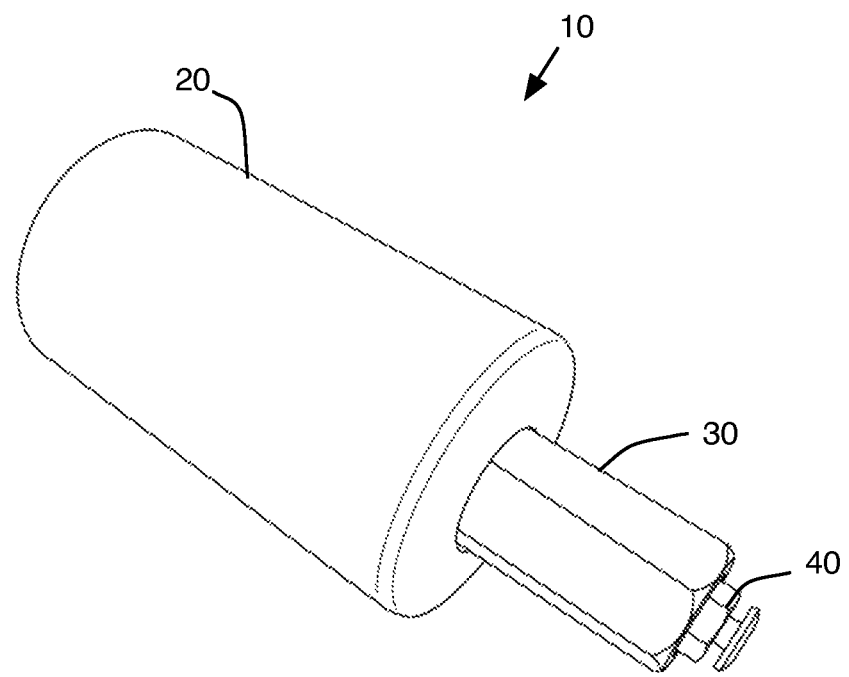
FIG. 1 is a perspective view illustration of an example apparatus for disabling a vehicle.

Referring to FIG. 1, an embodiment of an apparatus (also referred to herein as a plug) 10 for disabling a vehicle comprises an expandable head 20, a shaft 30 and a valve 40. Head is preferably expandable in a radial dimension and comprises an inner expansion mechanism covered with flexible and compressible material adapted to seal with the inner wall of an exhaust pipe when the head is in an expanded position. In some embodiments, shaft 30 is rotatable about a central axis such that rotating the shaft in one direction elongates and retracts the head 20 (e.g., such that the cross sectional radius of head 20 decreases), and rotating the shaft in the opposite direction longitudinally shortens and radially expands the head. The retracted and expanded states are shown in FIG. 2A and FIG. 2B, respectively.

Shaft 30 preferably includes an axial bore 350 that extends the length of the shaft. Valve 40 may be disposed at a proximal end of shaft and in communication with the bore, such that opening the valve 40 allows air to pass through the bore and closing the valve prevents or restricts the flow of air through the bore 350. In some embodiments, e.g., as shown in FIGS. 1 and 2, valve 40 may be a threaded drain valve. In some embodiments valve is a Porter Cable A17038 Drain Cock ¼" NPT Tank Drain. In some embodiments, valve 40 may be an may be a pneumatic bleeder valve providing simple pushbutton bleeding for release of compressed air or exhaust, e.g., an Interstate V11B 1/16 Inch MPT Bleeder Valve. Other types of valves, e.g., ball valve, needle valve, spigot valve, stem valve, or any other desired type of valve or port to selectively or adjustably inhibit and allow air flow through the bore 350 of shaft 30. Valve 40 may be secured to shaft via threads, or may be secured, fused or integrated with shaft by other desired means.

Figure 2A:
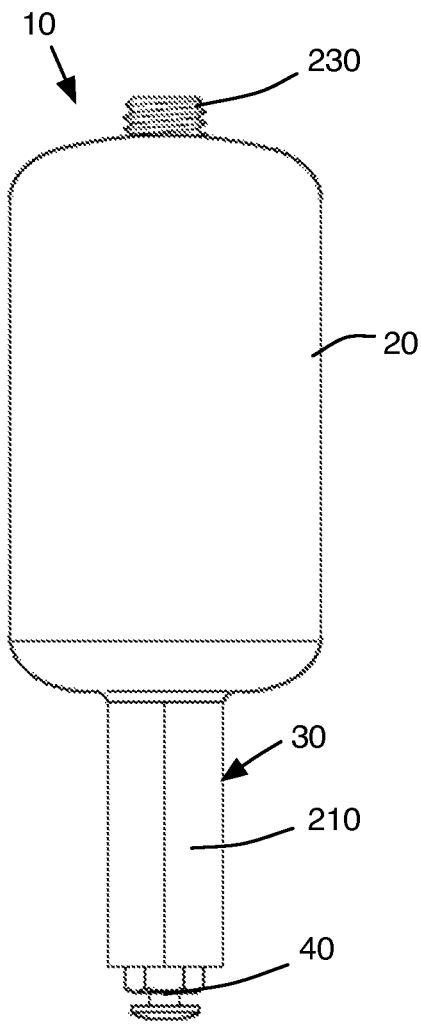
FIG. 2A is a side view of the apparatus of FIG. 1 with the body in a retracted state.
Figure 2B:
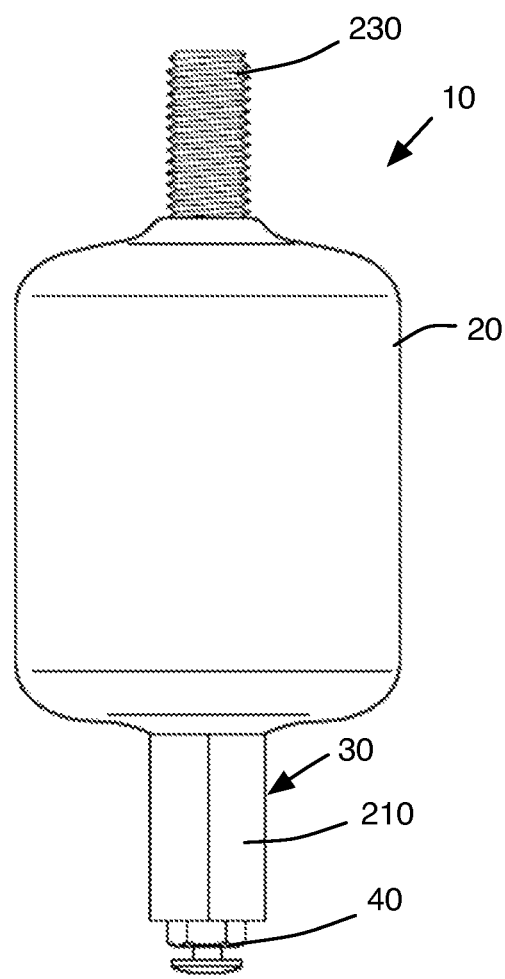
FIG. 2B is a side view of the apparatus of FIG. 2A with the body in an expanded state.

Referring to FIG. 2A and FIG. 2B, apparatus 10 is shown in its refracted (FIG. 2A) and expanded (FIG. 2B) states. In this embodiment, distal end 230 of shaft, e.g., end opposite valve 40, is threaded to engage with a nut (e.g., nut 340 of FIG. 3A) which travels along the length of threaded portion 230 when shaft 30 is rotated, thereby varying the length and thickness of head 20. The portion of shaft near its proximal end (e.g., the end closer to valve 40) is referred to herein as handle portion 210, and may be configured and dimensioned to engage a wrench or other tool, e.g., having a hexagonal shape as shown or another shape adapted to engage a socket wrench, driver or other tool to facilitate rotation of shaft. In other embodiments, handle portion 210 may include a grip feature to facilitate manipulation by the hand of a user.

Referring to FIG. 3A and FIG. 3B, an example of an expander assembly 300 that may be employed by plug apparatus 10 is shown. In this example, expander assembly includes a pair of opposing wedge members 310 and 312 disposed on shaft. Each wedge member may be generally frusto-pyramidal in shape, with the distal wedge member 310 circumposed on threaded portion 230 of shaft 30 and proximal wedge member 312 circumposed on a non-threaded, cylindrical shank portion (between handle portion 210 and threaded portion 230, e.g., shank portion 620 of FIG. 6). Each wedge member 310, 312 includes eight (or another desired number) planar wedge surfaces 314, each of which is angled and dimensioned to engage an end of an expansion segment 320. One or more elastic members 322 may be used to hold the expansion segments 320 in place and bias them against planar wedge surfaces 314.

Distal wedge member 310 has a hexagonal cavity dimensioned to engage nut 340 such that wedge member 310 travels along the length of threaded portion 230 with nut 340 as shaft 30 is rotated. Proximal wedge member 312 rotates freely with respect to shaft 30, and remains relatively fixed with respect to the longitudinal axis of the shaft, such that as wedge member 310 moves along the length of shaft during rotation of the shaft, the distance between wedge member 312 and 310 varies. As the distance between wedge members 312 and 310 decreases, expansion segments 320 are forced outward to expand the radium of head portion 20 of the assembly 300 (as shown in FIG. 2B).

In some embodiments, expansion assembly 300 may include aspects of an expander tool for expanding pipes, such as, for example, the expander tool disclosed in U.S. Pat. No. 3,986,383 to Petteys, the disclosure of which is incorporated by reference herein in its entirety. In other embodiments, other apparatus, methods, and/or mechanisms for adjustably expanding and retracting the radius of head portion 20 of plug device 10 may be used.

Figure 4:
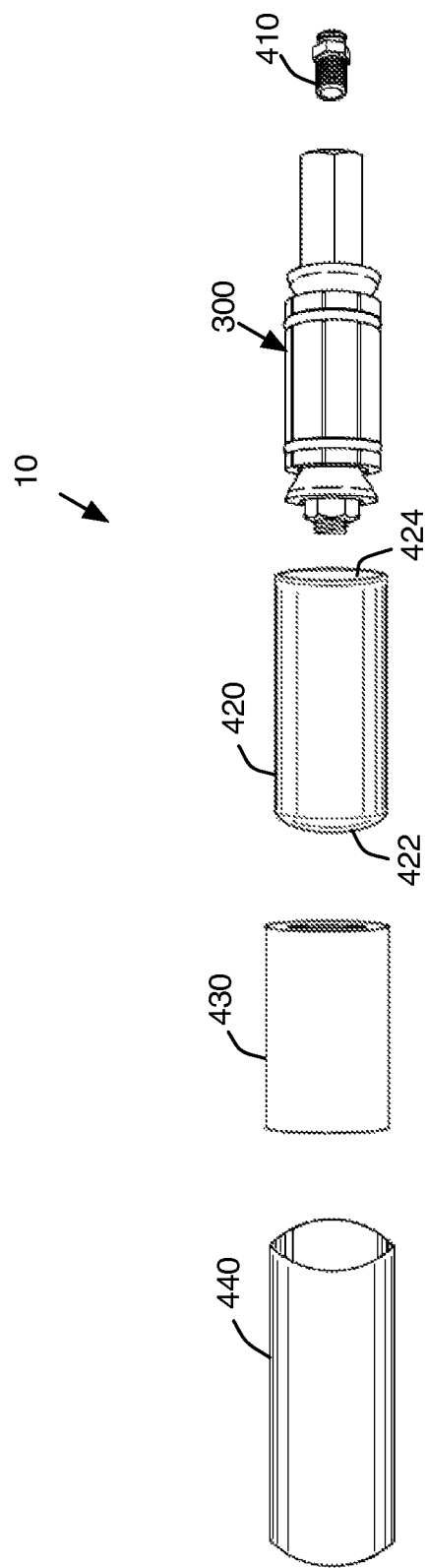
FIG. 4 is an exploded side-view illustration of an apparatus for disabling a vehicle in accordance with an example embodiment.

Turning now to FIG. 4, and exploded side view of plug apparatus 10 is shown. A valve 410 may insert within or attach to a distal end of the expansion assembly 300, as shown, e.g., to selectively prevent or control flow of air or vehicle exhaust through a central bore of the assembly 300. In some embodiments, valve 410 may be a pressure relief valve, a pneumatic bleeder valve, a drain cock valve, a ball valve, a needle valve, a spigot valve, a stem valve, or any other desired type of valve or port to selectively or adjustably inhibit and allow air flow through a central bore in assembly 300. In some embodiments, valve 410 may help prevent flow of air through the assembly when apparatus 10 is secured in a vehicle exhaust system. In some embodiments, a sleeve 430 is disposed over a seal 420, which may be substantially cylindrical as shown and include a capped end 422 and an open end 424 configured to fit over the expansion assembly 300. In some embodiments, the capped end 422 of the seal may include a hole or opening configured to align with the central bore of the assembly when the seal 420 is positioned over the assembly 300. In other embodiments, sleeve 430 may be used without seal 420. In some embodiments, one or both of sleeve 430 and seal 420 may be substantially elastic such that each expands and retracts with changes in diameter of expansion assembly 300. In some embodiments, sleeve 430 is thicker than seal and/or compressible such that it compresses against and facilitates sealing with an inner wall of a pipe when head 20 is expanded within the pipe. Sleeve 430 may also aid in retaining the expansion segments 320 in desired positions such that elastic members 322 may not be necessary. In some embodiments, sleeve member 430 comprises substantially elastic and compressible material, such as neoprene, foam padding, or other desired material. In some embodiments, seal 420, sleeve member 430, and/or an outer sleeve or sheath 440 are comprised of heat resistant material.

Figure 5:
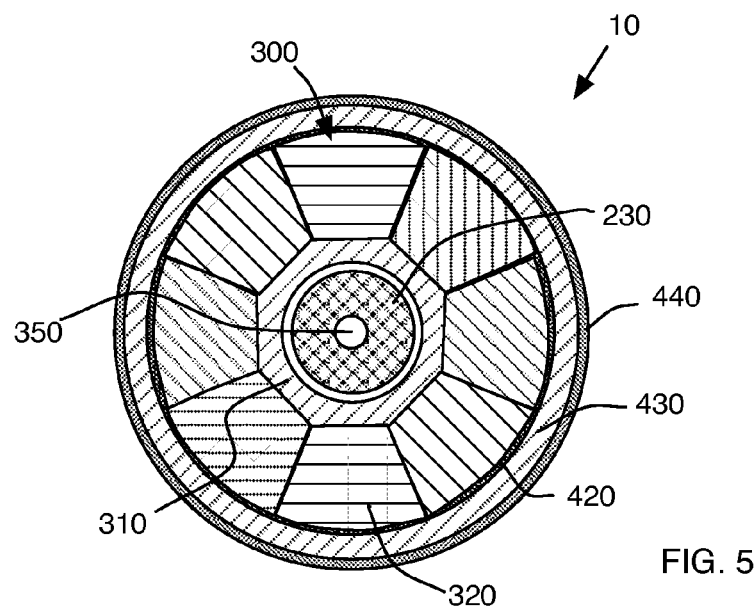
FIG. 5 is cross sectional view illustration of the apparatus of FIG. 4.

Referring to FIG. 5, a cross-sectional view of a plug apparatus 10 is shown according to one embodiment, here in a retracted state. In this example, cross section is taken through the head portion 20 of apparatus 10 at distal wedge member 310. Bore 350 is shown in cross section within threaded portion of shaft 230. Ends of eight expansion segments 320 are shown disposed annularly around shaft 230 and against planar wedge surfaces 314 of wedge member 310. Sleeve 430 is shown surrounding expansion segments 320 and an outer sheath 440 (e.g., made of shrink wrap tubing, rubber or other elastic material) covers sleeve 430 and ends of head 20 to facilitate sealing with the inner wall of a pipe. In some embodiments, a seal 420, is disposed over the expansion member 300 to help minimize leakage through and around components of the expansion member 300.

Figure 6:
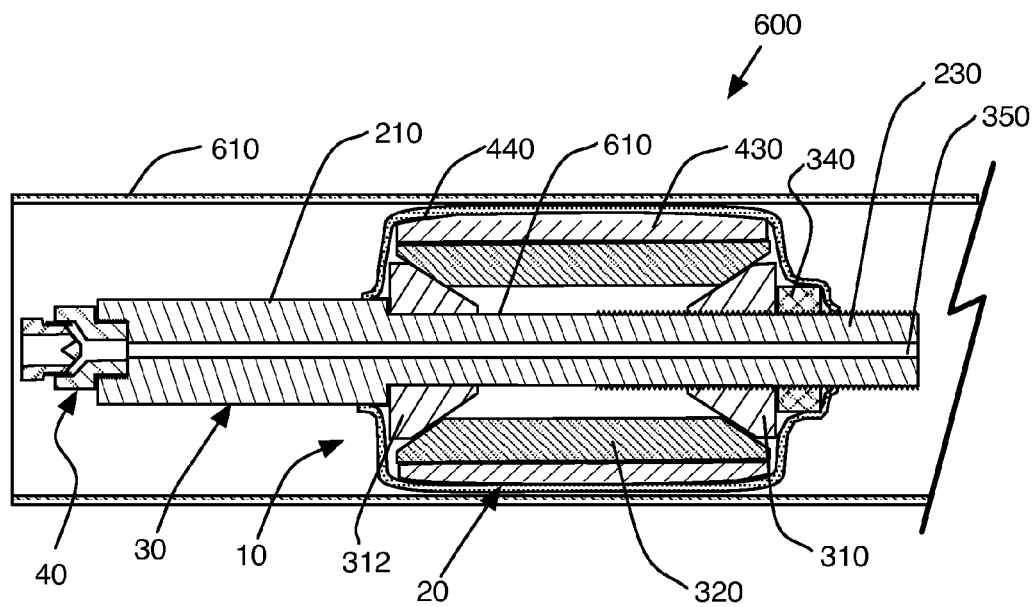
FIG. 6 is a longitudinal cross sectional view illustration of the apparatus of FIG. 1, inserted and secured within a tailpipe of a vehicle.

Referring to FIG. 6, a longitudinal cross-sectional view of a plug apparatus 10 is shown in use within segment of an exhaust tailpipe 610 of a vehicle. Head 20 of plug is shown in an expanded position, with wedge member 310 drawn toward member 312 when handle portion 210 of shaft 30 is rotated and nut 340 is moved along threaded portion 230 of shaft. This causes expansion segments to move outward radially, compressing sleeve 430 and sheath 440 against the inner wall of tailpipe 610. Handle 210 may be rotated by hand and/or by using a socket wrench, drill driver, or other tool to impart sufficient torque to shaft to secure apparatus 10 within pipe 610 with a desired radial force (e.g., to prevent apparatus 10 from being expelled when exhaust pressure builds up), and preferably without deforming or otherwise damaging pipe 610. In other embodiments, ratchet mechanisms, grip mechanisms (e.g., such as used on vice grips or other pipe expanders) or other means may be used to facilitate expansion of body 20. In some embodiment, handle portion 210 is configured and dimensioned to facilitate gripping and turning by a users hand. In some embodiments handle portion 210 is tightened to five foot-pounds or more of force to secure plug 10 within a tailpipe 610.

When plug apparatus 10 is secured within a tailpipe 610 as shown in FIG. 6, flow of exhaust through the tailpipe will be blocked, pressure will build within the exhaust system when the engine is started, and the engine will stall and/or fail to start. In some embodiments, outer sheath 440 covers distal end of head 20 and extends to threaded portion of shaft 230 to help restrict air from leaking thorough plug 10, e.g., around components 310, 320 and 312 and through head 20. In some embodiments, sheath 440 covers nut 340 at distal portion of shaft as shown in FIG. 6, and in other embodiments sheath 440 may be disposed between wedge member 310 and nut 340. Similarly, at proximal end of head 20, sheath 440 may cover member 312 and extend to handle portion 210 as shown in FIG. 6. In some embodiments, proximal end of sheath may extend to shank 620 and be disposed between wedge member 312 and proximal end of handle portion 210. Sheath 440 may be comprised of shrink wrap tubing, rubber or other desired material, and in some embodiments sheath 440 substantially resistant to heat to avoid melting or otherwise leaving residue on tailpipe when heated. Valve 40 may be twisted or otherwise engaged to prevent or restrict the flow of air through bore 350. In some embodiments, device may be disposed substantially or completely within a tailpipe such that the device is not readily visible from the side or rear of the vehicle. In other embodiments of use, handle portion 210 extends from the end of tailpipe to facilitate engagement by a tool or by the hand of a user.

Figure 7:
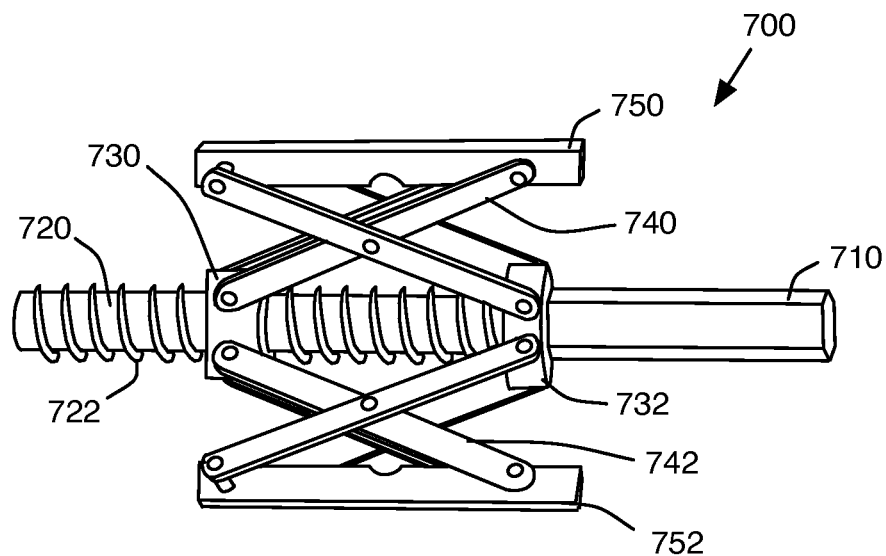
FIG. 7 is a side view illustration of an alternative expander mechanism according to an example embodiment.
Figure 8:
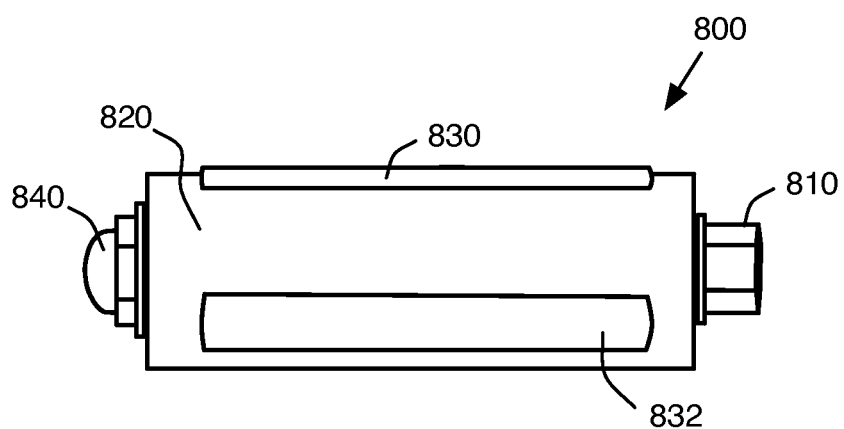
FIG. 8 is a side view illustration of an expander mechanism according to another example embodiment.

Turning now to FIG. 7 and FIG. 8, two alternative embodiment examples of expansion assemblies 700, 800 are shown. For example, assembly 700 may be adapted from or configured as a spider clamp having an elongate handle 710 and shaft 720, with threads 722 disposed about a circumference of shaft 720. Two collars 730, 732 may be disposed about the shaft 720, with the distal collar 730 engaged with threads 722 such that when handle 710 is rotated, collar 730 moves axially with respect to collar 732. Such movement of collar is translated through hinged members 740, 742 to move bars 750, 752 radially, i.e., to expand or contract an outer diameter of the expansion member 700.

Member 800 may be used in some embodiments to provide similar expansion of a device, e.g., to fit securely within a vehicle tail pipe. In some embodiments, member 800 includes a body 810 and a handle portion 820 that is rotatable about a central axis of the device 800. In some embodiments, a cap or nut 840, is disposed on a distal end of the handle or a coaxial shaft. In some embodiments, rotation of handle portion, 820 causes outward radial movement of longitudinal bars or rails 830, 832. Such outward movement may be used to provide overall expansion or contraction of an apparatus 10, e.g., as with expansion members 700, 300 described above.

Figure 9:
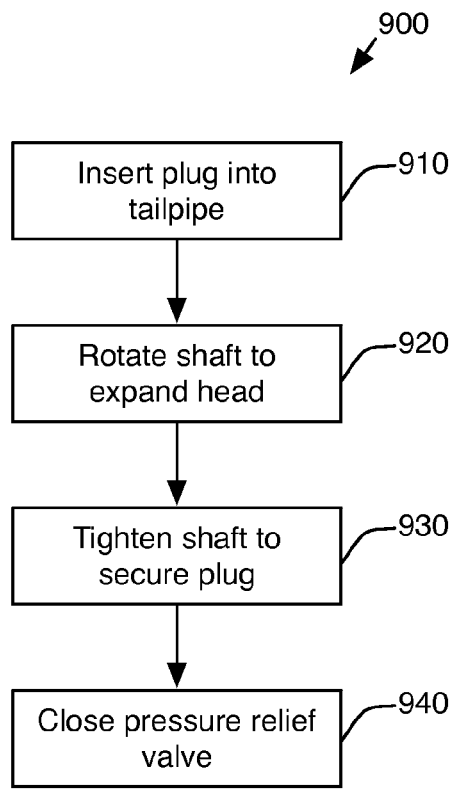
FIG. 9 is a flow chart of an embodiment of a method for disabling a vehicle.
Figure 10:
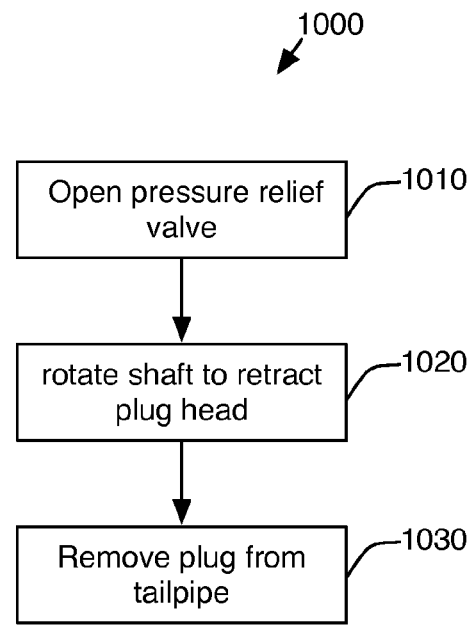
FIG. 10 is a flow chart of an embodiment of a method for removing a device for disabling a vehicle.

Referring to FIGS. 9 and 10, flowcharts are shown for exemplary methods of securing 900 and removing 1000 a plug apparatus within a tailpipe. The exemplary method 900 for disabling a vehicle using a plug apparatus such as apparatus 10 may start with inserting the plug into the tailpipe 910. The handle portion of shaft may then be rotated 920 to expand the head of the plug. A tool may be used to tighten the shaft 730 to secure the plug within the tailpipe. In some embodiments, shaft 930 may be tightened by hand. Preferably, plug is secured with enough radial force to ensure that the apparatus is not expelled from the tailpipe when the engine is running and accelerated, and that the apparatus is not easily removed manually by an unauthorized user. In some embodiments, pressure relief valve may be closed 940. In other embodiments, a push or pull-button pressure relive valve is used, wherein the default position of a valve is closed, such that the valve remains closed in a resting state until a user presses or pulls a button, lever or other portion of the valve to open the valve and allow flow of air (or vehicle exhaust). In some embodiments, closing or opening the valve, or otherwise placing the valve into a desired state or position, may be done either before or after inserting the plug device within the tailpipe. In preferred embodiments, no modification to the tailpipe is necessary for securing the plug, and no damage is done to the tailpipe when used on a vehicle.

In some embodiments, a plug apparatus may be remotely activated. For example, when a plug is positioned within the tailpipe of a vehicle, the pressure relieve valve or other port in the device may be placed in a desired position (e.g., opened or closed). The valve may then be remotely activated, e.g., by a radio signal, Bluetooth, Wi-Fi, cell phone, or other wired or wireless communication signal or means. In some embodiments, a pressure relieve or exhaust valve is started in an open state (thereby allowing the flow of air and operating of the vehicle while the plug is inserted in the exhaust pipe), and then the valve may be wirelessly or remotely closed to restrict flow of air and disable a vehicle. In other embodiments, a valve may start in a closed state, such that the valve may be remotely, wirelessly, or otherwise selectively opened to allow flow of exhaust and operation of the vehicle. In some embodiments, the state of the plug and/or valve within the plug may by controlled or adjusted in response to a condition in the vehicle, e.g., by turning the vehicle on or off, a heat sensor, speed of the vehicle, a selector or switch within the vehicle, an alcohol breathalyzer, or another wired or wireless sensor or activator within the vehicle or outside the vehicle. In some embodiments, more than one plug may be used in a vehicle, e.g., in a vehicle with multiple exhaust pipes, to ensure effective disabling of the vehicle.

In exemplary method 1000 of removing a plug, the pressure relief valve 1010 is activated, for example by pressing, pulling or twisting a relieve valve mechanism to allow air to escape thereby reducing pressure within the exhaust system (and reducing a pressure differential acting on the plug). Such release of pressure may help avoid expulsion of the plug from the tailpipe when it is loosened or retracted. In some embodiments, tool may be used to loosen the plug 1020, e.g., by engaging and rotating the handle, and then plug may be removed from the tailpipe 1030.

The foregoing description illustrates various embodiments of apparatus and methods for disabling a vehicle, along with examples of how aspects may be implemented. The above examples and embodiments should not be deemed to be the only embodiments, and are presented to illustrate the flexibility and advantages of the present invention. Based on the above disclosure and the following claims, other arrangements, embodiments, implementations and equivalents will be evident to those skilled in the art and may be employed without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are explicitly contemplated herein.

What is claimed is:

1. An apparatus for disabling a vehicle, comprising:
    an elongated shaft having an axial bore extending through the shaft;
    an expandable head circumposed on the shaft, said head expandable radially from a central axis of shaft and comprising an elastic material configured to seal against an inner wall of a vehicle exhaust pipe when the head is expanded; and
    a valve secured to the shaft and in communication with the axial bore, such that opening the valve allows air flow through the bore and closing the valve inhibits air flow through the bore.

2. The apparatus of claim 1, wherein the elongated shaft comprises a proximal handle portion configured and dimensioned to engage a tool for rotating the shaft.

3. The apparatus of claim 2, wherein rotating the shaft in one direction shortens a longitudinal dimension of the head and expands the radial dimension of the head.

4. The apparatus of claim 1, wherein the shaft and the head are configured and dimensioned to fit entirely within the vehicle exhaust pipe when used to disable the vehicle.

5. The apparatus of claim 1, wherein the elastic material comprises a foam sleeve disposed around an expansion assembly within the expandable head.

6. The apparatus of claim 1, wherein said expandable head further comprises:
    an expansion assembly configured and dimensioned to radially expand when activated by a user;
    a sleeve disposed around the expansion assembly; and
    the elastic material disposed over the sleeve.

7. The apparatus of claim 6, wherein the elastic material comprises heat-shrink tubing.

8. The apparatus of claim 7, wherein the sleeve comprises a substantially elastic and compressible material.

9. The apparatus of claim 8, wherein the sleeve comprises neoprene.

10. The apparatus of claim 6, wherein said expandable head further comprises a seal disposed between the sleeve and the expansion assembly.

11. The apparatus of claim 10, wherein the seal is substantially elastic and cylindrical, including a distal cap and a proximal open end, said proximal open end configured and dimensioned to fit over the expansion assembly.

12. The apparatus of claim 11, wherein the distal cap of the seal includes an opening configured to align with the axial bore of the elongated shaft, such that the seal restricts flow of air through the expansion assembly except for the axial bore.

13. The apparatus of claim 1, wherein the head is configured to secure within and block an exhaust pipe without alteration to the exhaust pipe.

14. A method for disabling a vehicle, comprising:
    inserting a plug into an exhaust pipe of the vehicle, said plug comprising an elongate shaft having an axial bore and an expandable head circumposed on the shaft; and
    expanding the head radially with respect to the shaft, such that the head secures within and seals against an inner wall of the exhaust pipe.

15. The method of claim 14, wherein the plug comprises a relief valve adapted to selectively restrict and allow flow of air through the axial bore.

16. The method of claim 15, further comprising closing the relief valve to restrict flow of air through the bore of the shaft.

17. The method of claim 15, further comprising the step of opening the relief valve to relieve pressure within the exhaust pipe of the vehicle before retracting the head to remove the device from the exhaust pipe.

18. The method of claim 14, wherein expanding the head comprises rotating the shaft.

19. The method of claim 18, wherein rotating the shaft comprises engaging a proximal handle of the shaft with a socket tool to facilitate rotation of the shaft.

* * * * *